US009243478B2

(12) United States Patent
Du et al.

(10) Patent No.: US 9,243,478 B2
(45) Date of Patent: Jan. 26, 2016

(54) PIPING SYSTEM HAVING AN INSULATED ANNULUS

(75) Inventors: Quangen Du, Fresno, TX (US); John Yarnold, League City, TX (US); Matthew Niemeyer, League City, TX (US); Baptiste Germond, Drucat (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 57 days.

(21) Appl. No.: 13/594,661

(22) Filed: Aug. 24, 2012

(65) Prior Publication Data
US 2013/0092389 A1 Apr. 18, 2013

Related U.S. Application Data

(60) Provisional application No. 61/528,592, filed on Aug. 29, 2011.

(51) Int. Cl.
*E21B 17/01* (2006.01)
*E21B 43/01* (2006.01)
*F16L 59/14* (2006.01)
*E21B 33/035* (2006.01)
*E21B 34/04* (2006.01)
*E21B 34/16* (2006.01)

(52) U.S. Cl.
CPC .............. *E21B 43/01* (2013.01); *E21B 17/01* (2013.01); *E21B 33/0355* (2013.01); *E21B 34/045* (2013.01); *E21B 34/16* (2013.01); *F16L 59/14* (2013.01)

(58) Field of Classification Search
CPC ..... E21B 17/01; E21B 17/003; E21B 36/003; E21B 47/011; F16L 59/14

USPC .............. 166/367, 344, 350, 242.1; 138/111, 138/114, 149

See application file for complete search history.

(56) References Cited

U.S. PATENT DOCUMENTS

| 3,511,282 | A | * | 5/1970 | Martin et al. ................. 138/113 |
| 3,526,086 | A | * | 9/1970 | Morgan ........................ 138/111 |
| 4,332,509 | A | * | 6/1982 | Reynard et al. ............. 405/168.1 |
| H000594 | H | * | 3/1989 | Adorjan ........................ 138/148 |
| 5,148,864 | A | * | 9/1992 | Willis et al. .................. 166/65.1 |
| 6,000,438 | A | * | 12/1999 | Ohrn ............................. 138/149 |
| 6,058,979 | A | * | 5/2000 | Watkins ........................ 138/149 |
| 6,082,391 | A | * | 7/2000 | Thiebaud et al. .......... 137/236.1 |
| 6,202,753 | B1 | | 3/2001 | Baugh |
| 6,321,844 | B1 | * | 11/2001 | Thiebaud et al. ............ 166/345 |
| 6,851,481 | B2 | * | 2/2005 | Vinegar et al. ................ 166/374 |
| 6,940,054 | B1 | * | 9/2005 | Heggdal ....................... 219/629 |

(Continued)

FOREIGN PATENT DOCUMENTS

| WO | 02063128 | 8/2002 |
| WO | 2009079784 | 7/2009 |

*Primary Examiner* — Matthew Buck
(74) *Attorney, Agent, or Firm* — Patrick Traister; Jeffery Peterson

(57) ABSTRACT

A piping system for housing system components for regulating the flow of fluid therethrough is provided. The piping system includes an inner small diameter length of piping through which hot fluids flow, an outer larger diameter length of piping surrounded by cold fluid, and an annulus between the small and larger diameter piping in which the system components are received. Insulation material extends about a predetermined section of the small diameter length of piping for restricting heat transfer therefrom to the system components in the annulus and allowing heat transfer from the system components in the annulus to the outer piping.

17 Claims, 11 Drawing Sheets

(56) References Cited

U.S. PATENT DOCUMENTS

| | | | |
|---|---|---|---|
| 6,973,244 B2* | 12/2005 | Karlsen | 385/100 |
| 2004/0040716 A1* | 3/2004 | Bursaux | 166/303 |
| 2004/0076478 A1* | 4/2004 | Legras et al. | 405/224.2 |
| 2005/0155658 A1 | 7/2005 | White | |
| 2006/0207673 A1* | 9/2006 | O'Brien et al. | 138/114 |

* cited by examiner

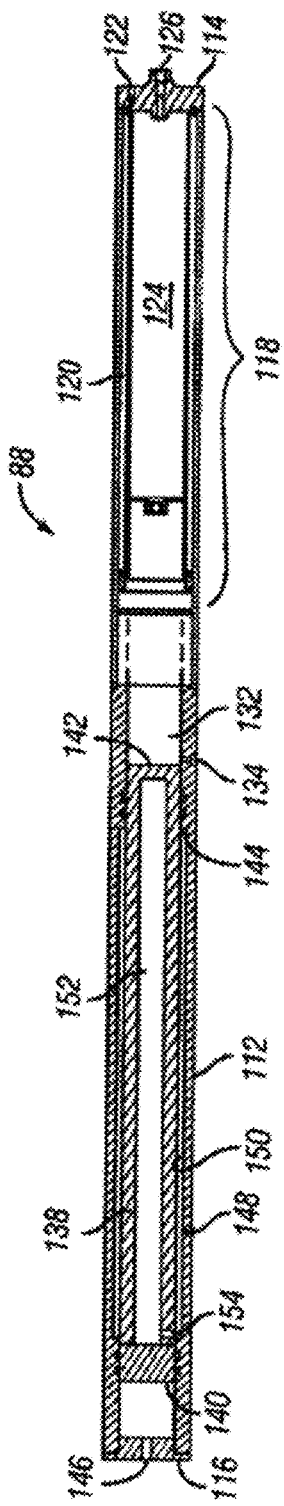
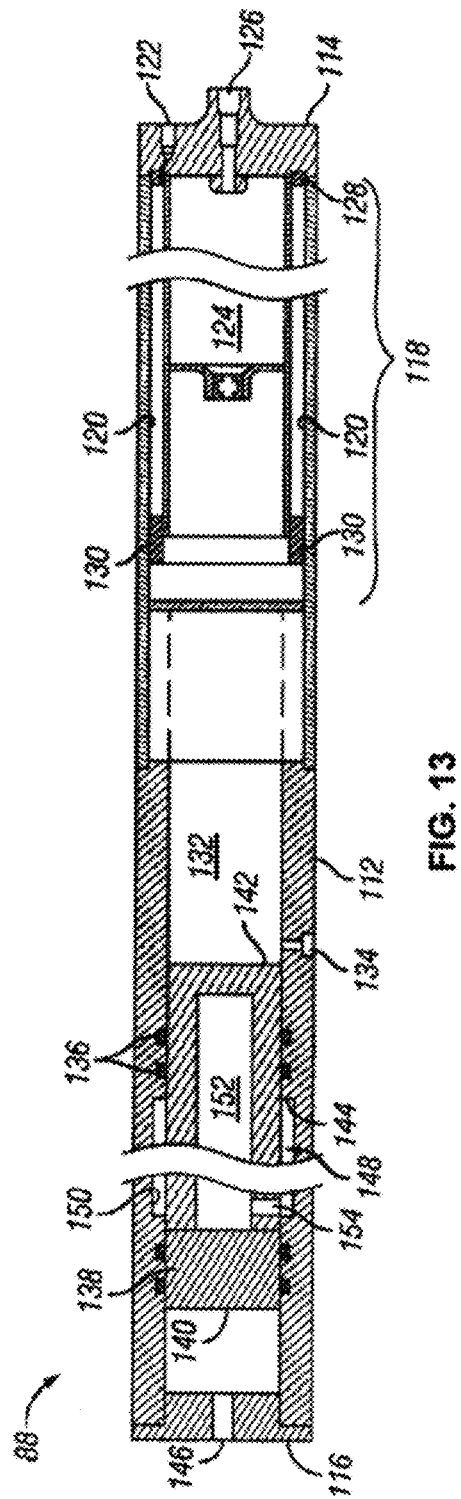
FIG. 12
FIG. 13 ations. In those cases, pressure balanced accumulators can be used. Pressure balanced accumulators connect with the ambient pressure to exert pressure on the gas to compensate for the depth and ambient pressure.

PIPING SYSTEM HAVING AN INSULATED ANNULUS

CROSS REFERENCES TO RELATED APPLICATIONS

This application claims benefit under 35 U.S.C. §119(e) to U.S. Provisional Application No. 61/528,592 entitled "Thermal insulation for Subsea Installations" filed Aug. 29, 2011, the contents of which are incorporated herein by reference in its entirety.

BACKGROUND

For subsea intervention operations, access to the well is gained by way of a production tube that is connected to a wellhead/christmas tree. Often, a riser is extended horn a wellhead to the ocean surface and the production tube is extended there through to the wellhead/christmas tree. An annulus is between the outside of the production tube and the inside of the riser. During intervention, flowback of well fluids can take place in the production tube. The well fluids are often hot and can be up to at least approximately 450° F.

For intervention a subsea test tree in connection with a subsea control module is integrated with the production tube and is used to control flow by way of various flapper and ball valves in the subsea test tree. The subsea control module can include accumulators. The accumulators can be pressure balanced accumulators. An accumulator is a device that stores potential energy. Often the potential energy is stored by way of compressed fluid, e.g., gas such as nitrogen or helium that transfers energy to a non-compressible fluid by way of a piston. The non-compressible fluid can be used to actuate tools by way of hydraulic, pressure. Valves (such as solenoid valves) can be used to control the output of the hydraulic fluid from the accumulator. Such solenoid valves can be controlled by a subsea electronics module. The subsea electronics module can be located proximate the subsea control module and integrated therewith. The subsea electronics module can also be located at surface and connect to the solenoid valves remotely. The subsea electronics module can receive signals electrically by wire, by acoustic transmission, by optical signals, or by pressure pulses.

Issues can arise with respect to deep water operations where ambient pressure is very high. In those cases the potential energy stored in the gas is less able to overcome the ambient pressure to perform the desired work. In those cases, pressure balanced accumulators can be used. Pressure balanced accumulators connect with the ambient pressure to exert pressure on the gas to compensate for the depth and ambient pressure.

SUMMARY

This summary is provided to introduce a selection of concepts that further described below in the detailed description. This summary is not intended to identify key or essential features of the claimed subject matter, nor is it intended to be used as an aid in limiting the scope of the claims subject matter.

In general, a piping, system for housing system components for regulating the flow of fluid therethrough is provided. The piping system includes an inner small diameter length of piping through which hot fluids flow, an outer larger diameter length of piping surrounded by cold fluid, and an annulus between the small and larger diameter piping in which the system components are received. Insulation material extends about a predetermined section of the small diameter length of piping for restricting heat transfer therefrom to the system components in the annulus and allowing heat transfer from the system components in the annulus to the outer piping.

In another form, an offshore oil well installation is provided including, a production string extending in the ocean from to subsea well to a rig for flow of hot well fluid therethrough. A riser extends about the production string for isolated the production string from cold ocean water. An annulus is formed between the production string and the riser, and at least one temperature sensitive operating device is in the annulus. Examples of temperature sensitive operating devices can include, but are not limited to, electronics, gas chambers of accumulators, subsea batteries, and hydraulic and electrical jumpers made of thermoplastic materials. Insulation in the annulus between the production string and the riser insulates the temperature sensitive operating device from the heat generated by flow of hot well fluid in the production string and keeps the temperature sensitive operating device exposed to cooling generated by cold ocean water surrounding the riser.

In yet another form, a subsea control module for an offshore oil well installation is provided. The subsea control module has an inner mandrel. An outer riser receives the inner mandrel therein and is surrounded by ocean water. Operating devices are mounted to be disposed about and to extend along the inner mandrel. Insulation is secured to extend about and alone; the inner mandrel adjacent to the operating devices.

BRIEF DESCRIPTION OF THE DRAWINGS

FIG. 12 is a cross-sectional view of one example of the pressure balanced accumulator illustrated in FIG. 11;

FIG. 13 is a cross-sectional view of an enlarged portion of the pressure balanced accumulator illustrated in FIG. 12;

DETAILED DESCRIPTION

Figure 1:
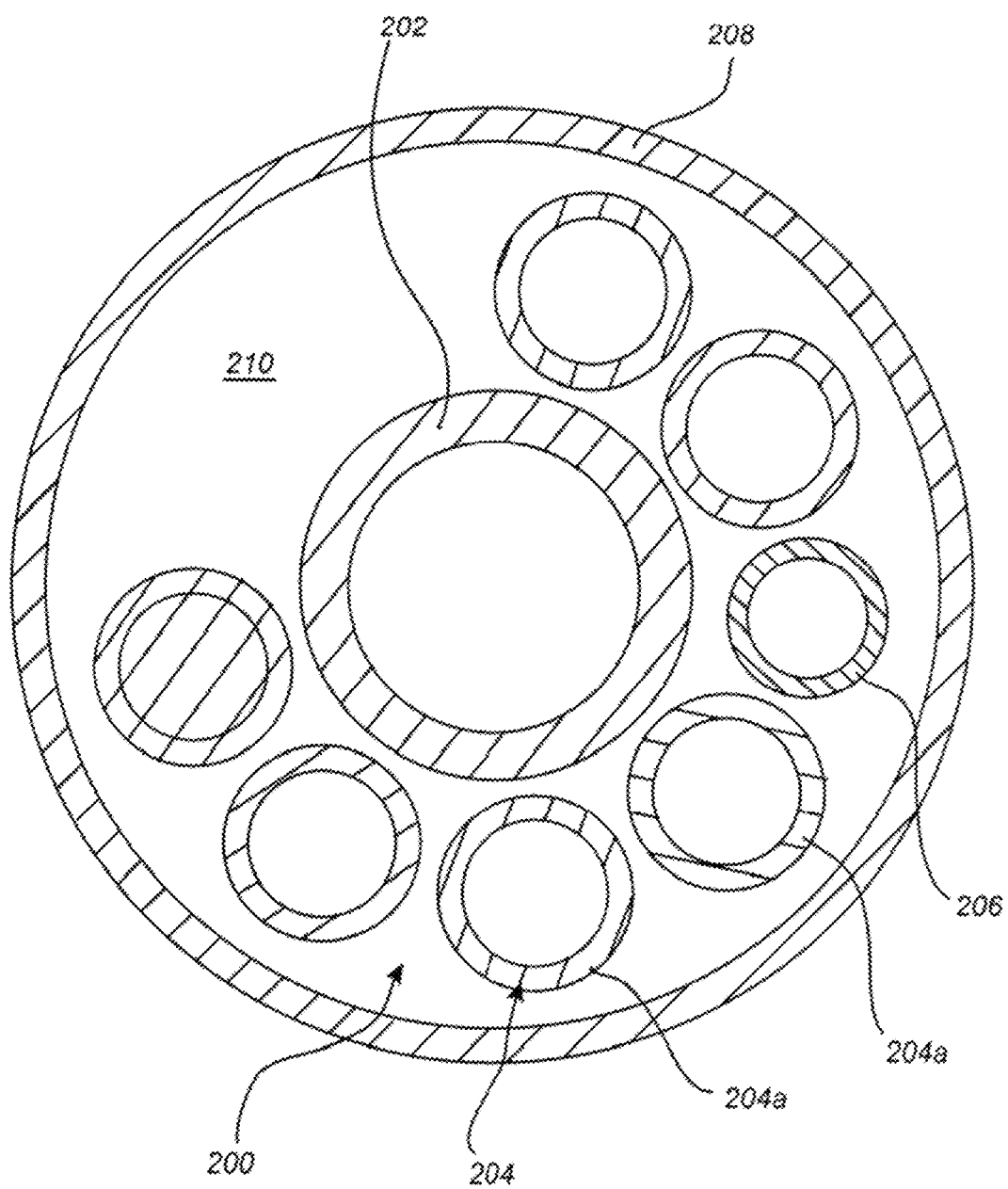
FIG. 1 is a schematic cross-sectional view of a prior subsea control module including accumulators thereof.

In the following description, numerous details are set forth to provide an understanding of the present application. However, it will be understood by those skilled in the art that the present invention may be practiced without many of these details and that numerous variations or modifications from the described embodiments are possible.

As used here, the terms "above" and "below"; "up" and "down"; "upper" and "lower", "upwardly" and "downwardly"; and other like terms indicating relative positions above or below a given point or element are used in this description to more clearly describe some embodiments of the invention. However, when applied to equipment and methods for use in wells that are deviated or horizontal, such terms may refer to a left to right, right to left, or diagonal relationship as appropriate.

Accumulators can be used to operate hydraulic tools in cases of emergencies. With that in mind, reliability can be of importance. Various factors can contribute to the longevity and reliability of an accumulator. One factor is temperature and temperature variations. For example, if the temperature rises to a level that was not planned for detrimental issues can result. Also, if the temperature of a tool varies greatly thermal stresses can result. Another factor is non-uniform temperatures. That is, a tool such as an accumulator's reliability can be compromised when one part of the tool is exposed to a different temperature than another part thereby creating uneven thermal expansion.

For subsea operations where accumulators (and pressure balanced accumulators) are used, while the sea water temperature is very predictable and stable at around 40° F., the temperature inside the annulus riser can increase dramatically during flowback and can frequently be as high as approximately 450° F. Flow back is a process of allowing fluids to flow from the well, either in preparation for a subsequent phase of treatment or in preparation for clean up and returning the well to production. The temperature variation in the in-riser annulus can have great impact on the functionalities and performance of mechanical and electrical tools located there. In the case of accumulators, thermal stresses can result and small tolerances can be affected due to thermal expansion. Delivery of hydraulic fluids through an umbilical can be impacted by high temperature by weakening the hydraulic hoses and reducing the life when the umbilical is clamped to the production tubing. For electrical devices (like circuit boards), due to the nature of the material that they are made of exposure to such high temperatures can be detrimental to longevity and performance. For mechanical tools, their performance may be de-rated or limited due to the temperature variations. The in-riser annulus is the radial space between the riser pipe and production pipe. This configuration is illustrated in FIG.

An objective of various embodiments in this application is to minimize the temperature changes and gradients experienced though the annulus due to flowback. Reducing spikes in the annulus temperature and reducing the temperature gradients will facilitate better performances of tools/devices for many in-riser applications. For accumulators used for the deep water control systems, insulation and reduction of a temperature gradient as described more fully hereinafter will lead to more uniform thermal exposure and reduction of the associated issues related to a high temperature gradient in the annulus. However, it should be understood that this application is not intended to be limited to the specific system components, devices or tools disposed in the annulus such as the accumulators described, herein. The present application relates to various embodiments that minimize the temperature variations due to the production pipe temperature increases by applying an insulation material such as a filament wound epoxy fiberglass composite material (or materials with similar properties, especially on thermal conductivity) as the thermal insulation media between the inner pipe and the tool.

According to another embodiment, to simply reduce the annulus temperature, it is possible to improve thermal exchanges between the outer part of the tool and its components by adding heat exchanging material to thermally conduct heat from the tool to the riser wall and which is in contact with the 40° F. sea water.

Figure 2:
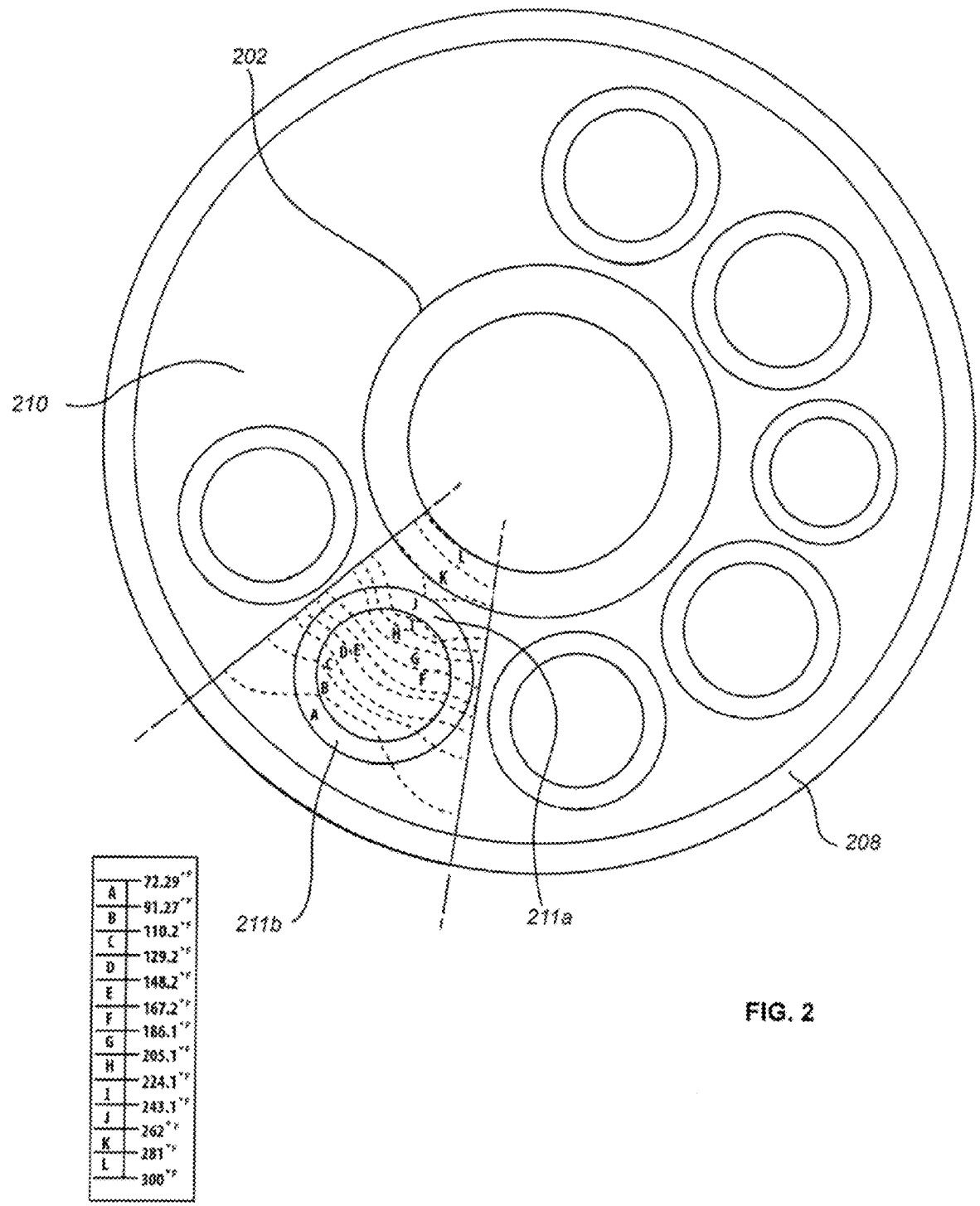
FIG. 2 is a schematic cross-sectional view of the prior subsea control module of FIG. 1 showing the temperature distribution in a section of the annulus in which a temperature sensitive operating device is disposed.

FIG. 1 shows a cross-section view of a subsea control system 200. That arrangement includes inner, small diameter production pipe or piping string 202, system components including temperature sensitive operating devices such as tools or actuators including accumulators 204 and a subsea electronics module (SEM) 206, and the outer, larger diameter riser pipe or piping 208. The environment temperature outside the riser pipe is that of sea water, which is relatively constantly at around 40° F. The temperature of the production pipe or inner pipe 202 varies and can be as high as approximately 450° F. due to flow back of well fluids. The annulus 210 between production pipe and riser pipe has a temperature profile that highly depends on the temperature of the cylindrical wall of the production pipe 202. A temperature profile of the annulus 210 with production pipe 202 at approximately 300° F. is shown in FIG. 2. The highest non-localized annulus temperature is approximately 250° F.

As is apparent, the extreme operating conditions created by the deep sea deployment of various control system operating components makes their efficiency and reliability a paramount concern. To this end, where the operation of these devices is temperature sensitive, locating these devices undersea in the annulus 210 having a widely varying temperature profile as shown in FIG. 2 can create challenges for their efficient and reliable operation. This wide temperature variation is exacerbated where the components have outer housings that are of heat conductive material such as the metal housing wall 204a of the accumulators 204. In this instance, it can be seen that the radially inner side of the accumulator cylindrical housing wall 204a generally facing the hot inner production pipe 202 will draw heat creating local hot spots 211a at this inner side of the accumulators 204. On the other hand, the radially outer side of the accumulator housing wall 204a will lose heat to the cold outer riser pipe 210 creating local cold spots 211b at the accumulator outer side thus exacerbating the temperature gradient across the accumulator 204 in a radial direction, as can be seen in FIG. 2. With pressure balanced accumulators, such extreme temperature variations from hot to cold can lead to variations in the volume of the gas charge which can degrade performance of these devices.

Figure 3:
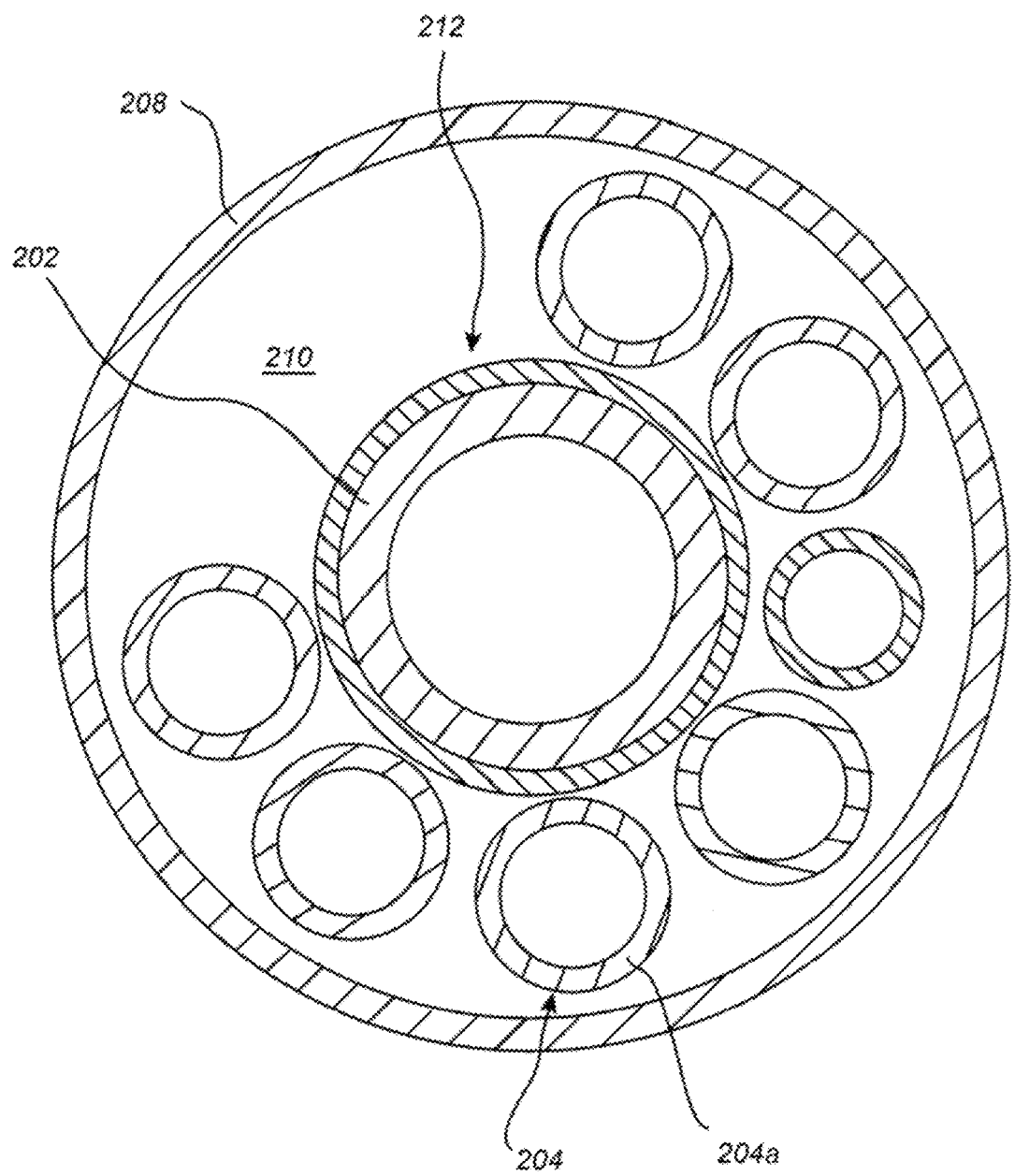
FIG. 3 is a schematic cross-sectional view of a subsea control module including insulation in the annulus in accordance with an embodiment herein.

According to various embodiments, a thermal insulation layer 212 can be disposed between the production pipe 202 and the annulus 210 to insulate the system components such as the accumulators 204 and the SEM 206 in the annulus 210 from the high temperatures in the production pipe while at the same time keeping these components exposed to the cooling effect provided by the outer riser piping 208 due to the surrounding cold ocean water. FIG. 3 shows this arrangement. With the same or similar production pipe temperature, (approximately 300° F.), the thermal simulation results show that the highest annulus temperature is about 125° F., nearly 125° F. lower compared to the case without the thermal insulation (see a temperature distribution contour shown in FIG. 4). Additionally, the temperature gradient seen across the annulus 210 is improved.

Figure 4:
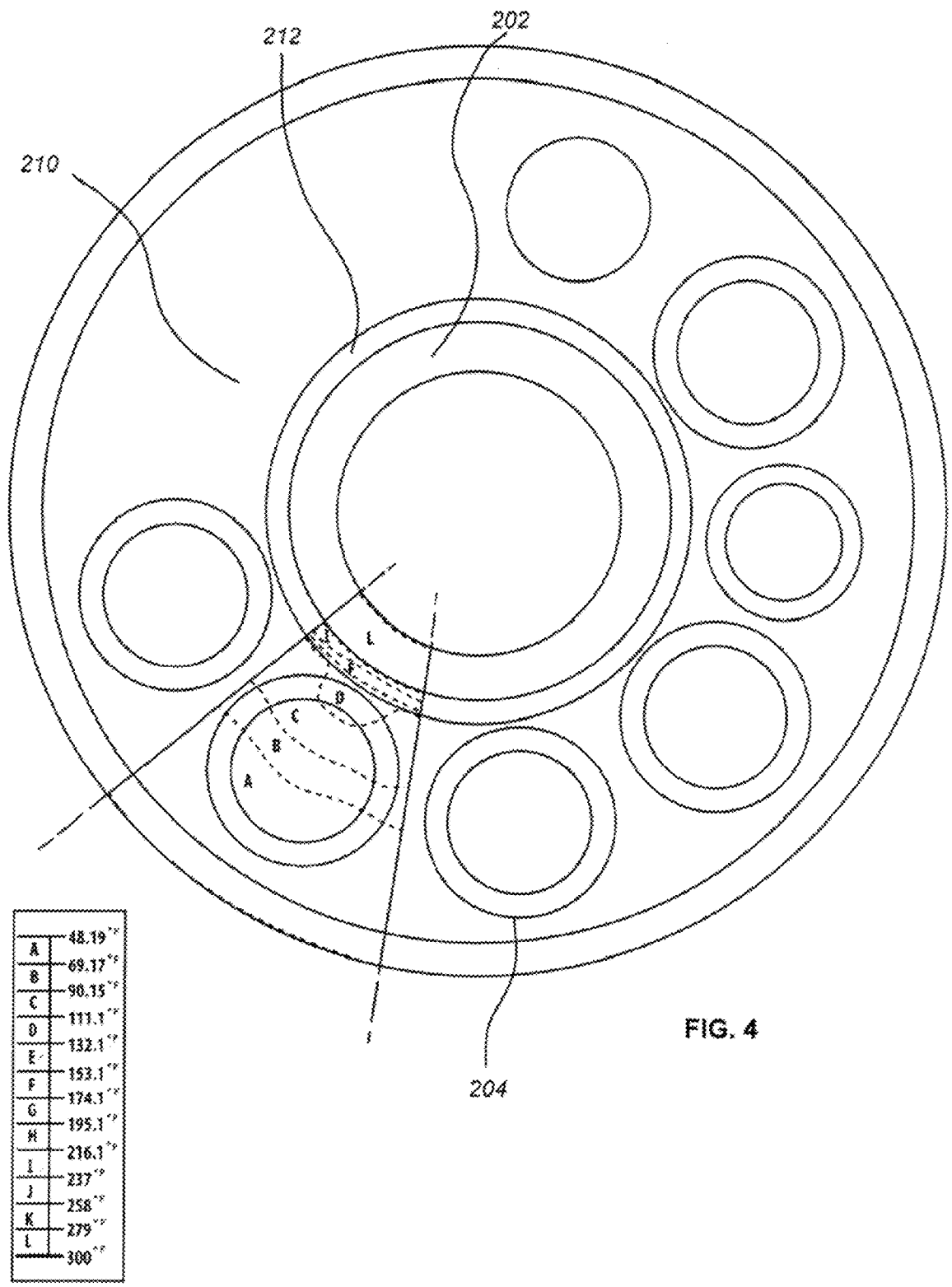
FIG. 4 is a schematic cross-sectional view of the subsea control module of FIG. 3 showing the temperature distribution in a section of the annulus in which a temperature sensitive operating device is disposed.

The insulation 212 can substantially isolate the heat inside the production pipe 202, thereby keeping the annulus temperature much lower than would be otherwise without the insulation 212. This also improves the temperature gradient seen across the annulus 210. Embodiments of this design have numerous benefits. For example, one benefit is keeping the heat away from any device in the annulus 210. According, to some embodiments, the device can be an accumulator(s), and could be a pressure balanced accumulator(s). As can be seen in FIG. 4, the temperature gradient across the accumulators 204 is more gradual from the inner slightly warmer side to the cooler outer side thereof as opposed to the more severe temperature gradient shown in FIG. 2. As such, with the insulated piping system disclosed herein, the system components no longer need to be qualified for high temperature performance because of the harsh environment in the annulus 210 as depicted in FIG. 2. Instead, standard or off-the-shelf components can now be used in the annulus 210 where the temperature variations are relatively minor due to the insulation 212 between the inner pipe 202 and the components disposed in the annulus 210. Also, more particularly, the gas change used with pressure balanced accumulators will not be subjected to wide temperature fluctuations minimizing variations in the volume of the gas and thereby maintaining optimized performance of these devices.

Another aspect, for some situations, is to contain the heat which may be beneficial to the desired applications. The thermal insulation layer can be used to isolate the device from the cooling source. Also, the temperature gradient can be reduced across the annulus. Moreover, it should be noted that the insulation material is not limited to only the fiberglass composite material. Other materials with similar thermal conductivities can be suited for the intended applications and can serve the same or similar insulation purpose.

The filament-wound fiberglass epoxy composite material can be wrapped about the outer surface of the inner production pipe string 202 and bonded thereto by the epoxy. It is believed that the combination of tensile and flexural strength provided by the fiberglass epoxy composite insulation material will be sufficient to keep the insulation material secured to the production string 202 despite the flexing and tension loads to which the production piping string 202 is exposed. By way of example, at 300° F., the fiberglass epoxy composite has a tensile strength of approximately 345 MPa and a flexural strength of approximately 207 MPa.

Turning to more of the details of systems that can benefit from the piping system and insulated annulus thereof described herein, one such system is an overall subsea control system comprising a subsea test tree, such as a subsea test tree located within a riser, and an associated control. According to one embodiment, the subsea control system is a subsea wellhead control system comprising a subsea installation with an independently controlled subsea test tree. The subsea test tree comprises an upper portion separable from a lower portion and a plurality of shut-off valves. At least one shut-off valve is located in each of the upper portion and the lower portion.

Figure 5:
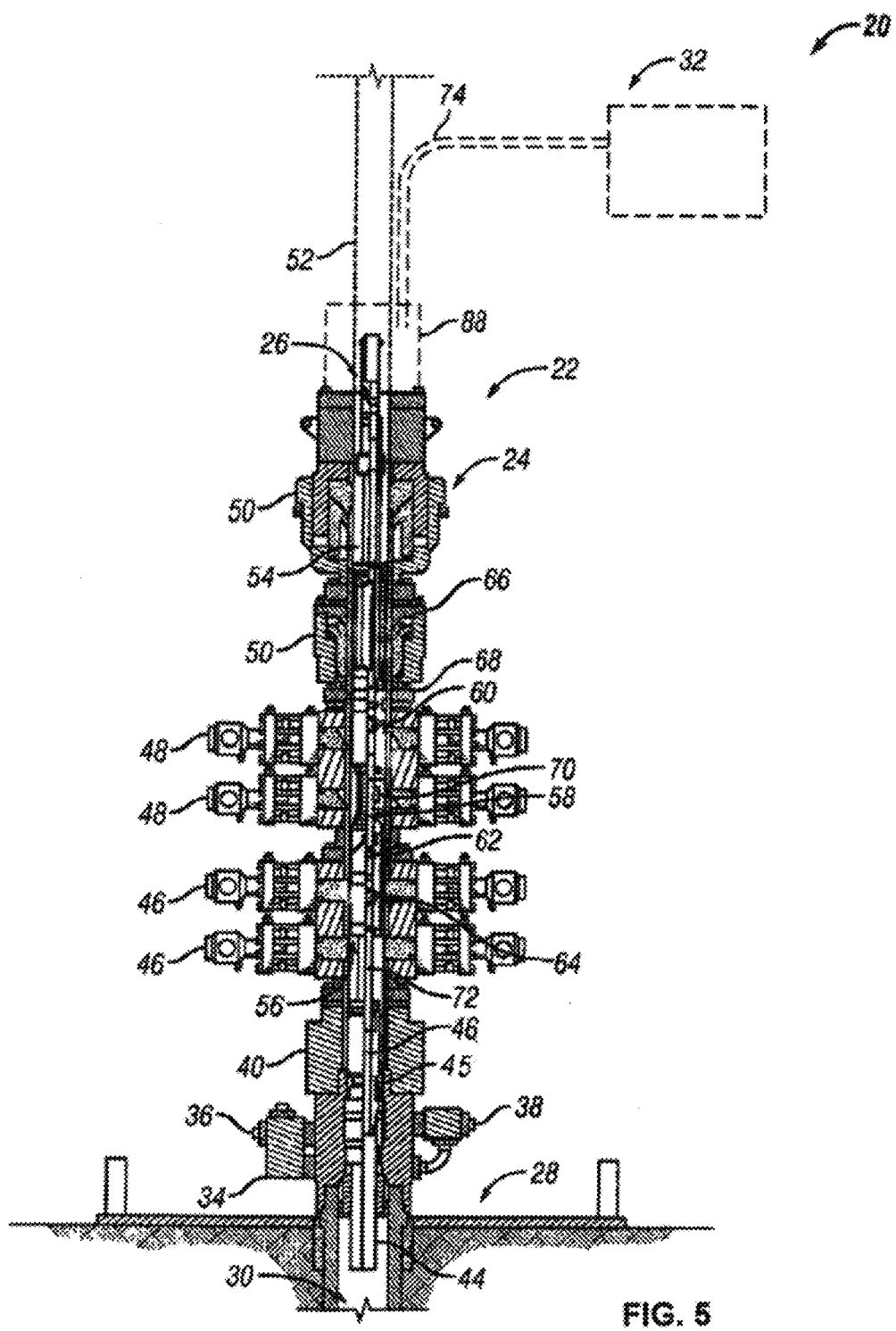
FIG. 5 is an illustration of a subsea installation and an associated control system.

Referring, generally to FIG. 5 a well system 20 is illustrated, according to one embodiment of the present invention. In the example illustrated, well system 20 is a subsea control system comprising a subsea installation 22 which includes a production control system 24 cooperating with a subsea test tree 26. The subsea installation 22 is positioned at a subsea location 2 generally over a well 30 such as an oil and/or gas production well. Additionally, a control system 32 is employed to control operation of the production control system 24 and subsea test tree 26. The control system 32 may comprise an integrated system or independent systems for controlling the various components of the production control system and the subsea test tree.

Although the production control system 24 and subsea test tree 26 may comprise a variety of components depending on the specific application and well environment in which a production operation is to be conducted, specific examples are discussed to facilitate an understanding of the present system and technique. The present invention, however, is not limited to the specific embodiments described. In one embodiment, production control system 24 comprises a horizontal tree section 34 having, for example, a production line 36 and an annulus line 38. A blowout preventer 40, e.g. a blowout preventer stack, may be positioned in cooperation with the horizontal tree section 34 to protect against blowouts. These components also comprise an internal passageway 42 to accommodate passage of tubing string components 44 and related components, such as a tubing hanger/running tool 45.

The production control system 24 also may comprise a variety of additional components incorporated into or positioned above blowout preventer 40. For example, at least one pipe ram 46 may be mounted in subsea installation 22 at a suitable location. In embodiment illustrated, two pipe rams 46 are employed. The system also may comprise at least one shear ram 48, such as the two shear rams illustrated. Additionally, one or more, e.g. two, annular rams 50 may be employed in the system. The various production control systems 24 accommodate a riser 52 designed to receive subsea test tree 26.

In the embodiment illustrated, the subsea test tree 26 comprises an upper portion 54 releasably coupled with a lower portion 56 via a connector 58, such as a latch connector. The upper portion 54 and the lower portion 56 each contain at least one shut-off valve which may be selectively actuated to block flow of production fluid through the subsea installation 22. The various components of subsea installation 22 are designed to allow an emergency shutdown. For example, subsea test tree 26 enables provision of a safety system installed within riser 52 during completion operations to facilitate safe, temporary closure of the subsea well 30. The control system 32 provides, hydraulic power to the subsea test tree 26 to enable control over the shut-off valves. Control over the subsea test tree 26 may be independent of the safety functions of the production control system 24, such as actuation of blowout preventer 40.

The shut-off valves in subsea test tree 26 may range in number and design. In one embodiment, however, the upper portion 54 comprises a retainer valve 60, as further illustrated in FIG. 6, in the specific embodiment illustrated, lower portion 56 comprises a pair of valves in the form of a flapper valve 62 and a ball valve 64. As desired for a given application, other components may be incorporated into subsea test tree 26. For example, the upper portion 54 may comprise additional components in the form of a space out sub 66, a bleed off valve 68, and a shear sub 70. Similarly, the lower portion 56 may comprise additional components, such as a ported joint 72 extending down to tubing hanger 46.

The shut-off valves may be controlled electrically, hydraulically, or by other suitable techniques. In the embodiment illustrated, however, valves 60, 62, 64 are controlled hydraulically via hydraulic lines 74. For example, the position of the valves 60, 62, 64 may be controlled via a combination of opened or closed directional control valves 76 located in, for example, a subsea control module 78. The directional control valve 76 control whether hydraulic pressure is present or vented on its assigned output port in the subsea test tree. The directional control valves 76 within subsea control module 78 may be controlled via solenoid valves or other actuators which may be energized via electrical signals sent from the surface. Accordingly, the overall control system 32 for controlling subsea test tree 26 may have a variety of topside and subsea components which work in cooperation.

During a specific valve operation, an operations engineer may issue a command via a human machine interface 80 of a master control station 82, such as a computer-based master control station. In some applications, the master control station 82 comprises or works in cooperation with one or more programmable logic controllers. Electric current is sent down through an umbilical 84 to the solenoid valves and subsea control module 78 to actuate directional control valves 76. The umbilical 84 also may comprise one or more hydraulic, control lines extending down to the subsea control module from a hydraulic power unit 86. In the embodiment illustrated in FIGS. 5 and 6, the hydraulic lines 74 also are routed to an accumulator 88, such as a subsea accumulator module.

When a desired directional control valve 76 is opened, hydraulic pressure supplied by hydraulic power unit 86 is passed through its assigned output port to the subsea test tree 26. Conversely, when a directional control valve 76 is closed, any hydraulic pressure present at its output port is vented. Hydraulic power is transferred from the subsea accumulator module 88 to a particular valve 60, 62, 64 located in the subsea test tree 26. The designated valve transitions and fulfills the intended safety instrumented function for a given situation.

An emergency shutdown sequence may be achieved through a series of commands sent to one or more of the valves 60, 62 and 64. The emergency shutdown sequence may be designed to bring the overall system to a safe state upon a given command. Depending on the specific, application, the emergency shutdown sequence also may control transition of additional valves, e.g. a topside production control valve, to a desired safety state.

If a complete loss of communication between the topside and subsea equipment occurs, i.e. loss or severing of the umbilical 84, the directional control valves 76 are designed to return to a natural or default state via, for example, spring actuation. This action automatically brings the well to a fail safe position with the topside riser and the well sealed and isolated. If the topside equipment is unable to bring the well into a safe state, then the operator can institute a block-and-bleed on the hydraulic power unit 86 to cause the subsea test tree to transition into its failsafe configuration. Additionally, visual and/or audible alerts may be used to alert an operator to a variety of fault or potential fault situations.

Figure 6:
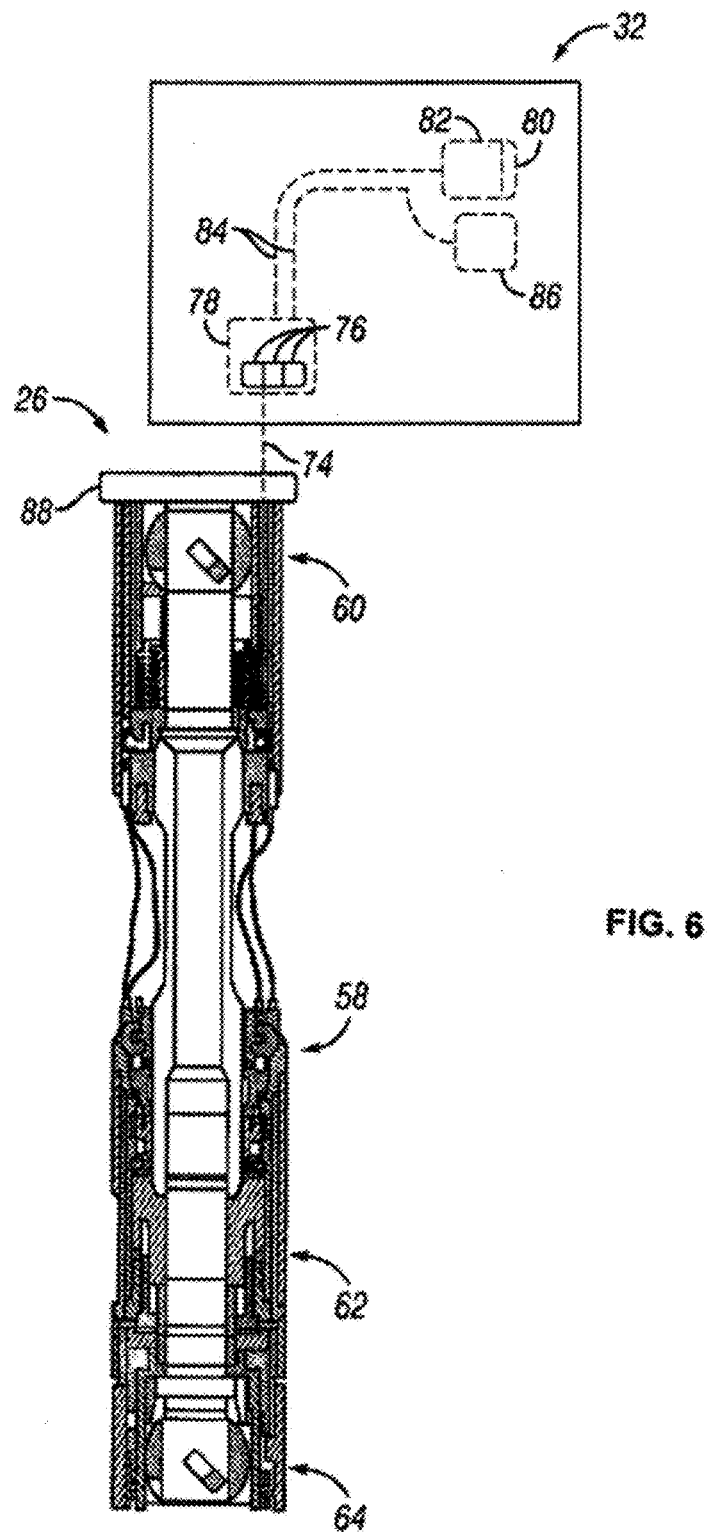
FIG. 6 is an illustration of a portion of a subsea test tree that can be used at the subsea installation.

In the specific example illustrated in FIG. 6 the subsea test tree 26 has four basic functions utilizing retainer valve 60, connector 58, flapper valve 62, and ball valve 64. The retainer valve 40 functions to contain riser fluids in riser 52 after upper portion 54 is disconnected from lower portion 56. The connector 58, e.g. latch mechanism, enables the riser 52 and upper portion 54 to be disconnected from the remaining subsea installation 22. The flapper valve 62 provides a second or supplemental barrier used to isolate and contain the subsea well. Similarly, the ball valve 64 is used to isolate and contain the subsea well as a first barrier against release of production fluid.

The subsea test tree 26 may be used in a variety of operational modes. For example, the subsea test tree 26 may be transition to a "normal mode". In this mode, a standard emergency shutdown sequence may be used in which a ball valve close function is performed to close ball valve 64. By way of example, the ball valve 64 may be closed by supplying hydraulic fluid at a desired pressure, e.g. 5 kpsi. Another mode is employed as the subsea test tree system is run in hole or pulled out of hole (RIH/POOH mode). In this mode, the valve functions are disabled to prevent a spurious unlatch at connector 58 while the assembly is suspended in riser 52. In another example, the system is placed in a "coil tubing" mode when coil tubing is present in riser 52 while a disconnect is to be initiated. In this mode, the ball valve is actuated under a higher pressure, e.g. 10 kpsi, to enable severing of the tubing via, for example, shear rams 48.

The control system 32 also may be designed to operate in a diagnostic mode. The diagnostic mode is useful in determining the integrity of the signal path as well as the basic functionality of the subsea control module, including the solenoid valves and directional control valves. In this mode, a selected current, e.g. a 30 mA current, is delivered down each of the electric lines, e.g. seven lines, within umbilical 84. Then, by verifying the voltage required to drive this current, the impedance of the system can be inferred. This current is insufficient to trigger a solenoid into actuation, but the current may be used to verify various operational parameters. Examples of verifying operational parameters include: verifying delivery of power to the system from an uninterruptible power supply; verifying the solenoid driver power supply is functional; verifying performance of a programmable logic controller; verifying that all connectors are intact; and verifying solenoids have not failed in an open or shorted manner. The diagnostic testing can be performed on command from a SCADA, or as a self-diagnostic function at pre-determined time intervals depending on results of a hazard and operability application.

Figure 7:
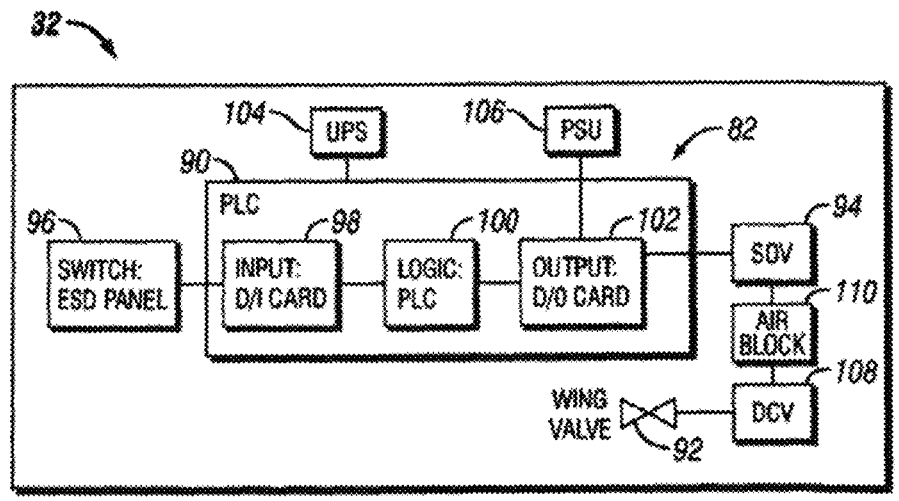
FIG. 7 is a schematic illustration of a portion of the associated control system.
Figure 8:
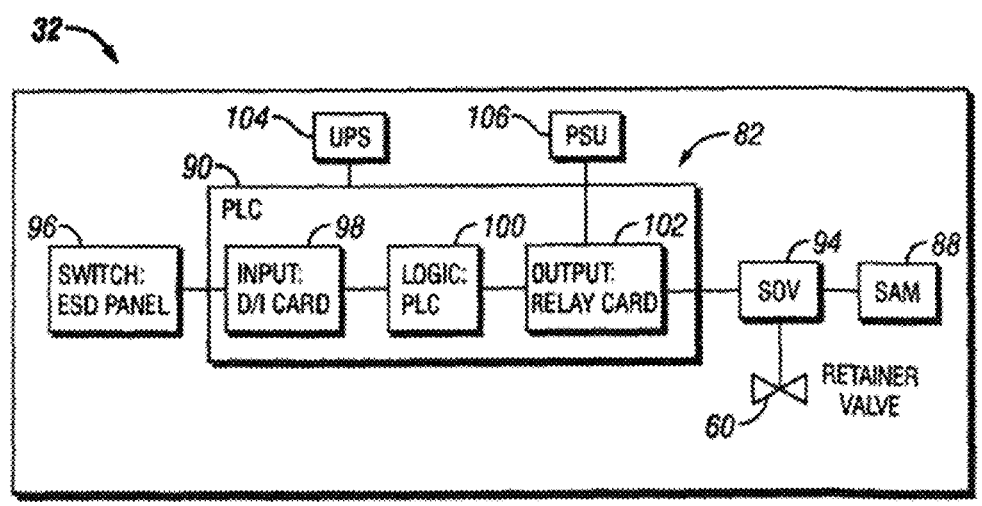
FIG. 8 is a schematic illustration of another portion of the associated control system.
Figure 9:
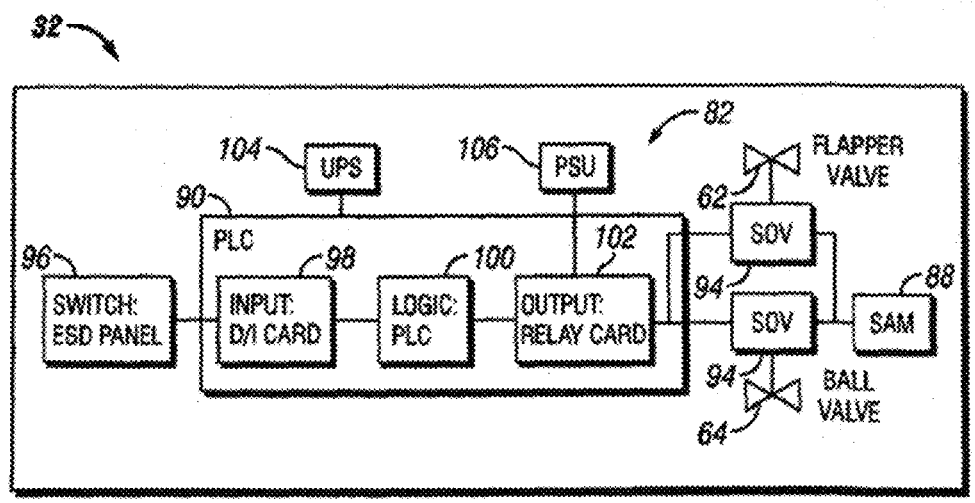
FIG. 9 is a schematic illustration of another portion of the associated control system.

Referring, generally to FIGS. 7-9, a variety of subsea control system functions/implementations are illustrated via schematic block diagrams. In the embodiment illustrated in FIG. 7, for example, control system 32 utilizes a surface based master control system 82 comprising a programmable logic control system 90 to isolate topside flow output via a production wing valve 92. The wing valve 92 may comprise a master valve, a downhole safety valve, or another wing valve operated by the production control system. By way of example, the overall system may be designed at an SIL3 level while the subsea test tree employed in the subsea installation 22 is at an SIL2 level.

In the embodiment illustrated in FIG. 7, the topside wing valve 92 is operated by a high pressure system through a solenoid actuated valve 94 controlled via programmable logic controller 90 in master control system 82. The valve 94 is considered to be in a safe state when it is in its closed position. To avoid, problems if programmable logic controller 90 fails to actuate the valve when desired, the system may be designed to enable manual triggering of the valve. Verification that wing valve 92 has been actuated can be based on select parameters. For example, the verification may be based on detection of actuation current delivered by the master control system; detection of the actuation voltage required to achieve the desired current (implied impedance); and/or operator verification of the position of the wing valve via an appropriate gauge or sensor.

In the specific example illustrated, programmable logic controller 90 is coupled to an emergency shutdown panel 96. Additionally, the programmable logic controller 90 comprises an input module 98, a logic module 100, and an output module 102. The programmable logic controller 90 may be powered by an uninterruptible power supply 104, and the output module 102 may be independently coupled to a power supply unit 106. The output module 102 controls actuation of solenoid valve 94 which, in turn, controls delivery of hydraulic actuation fluid to wing valve 92. Additional components may be positioned between solenoid valve 94 and wing valve 92 to provide an added level of control and safety. Examples of such components comprise a supplemental valve 108 and an air block 110.

A similar control technique may be used to control actuation of retainer valve 60 in upper portion 54, as illustrated in FIG. 8. In this example, the emergency shutdown sub function begins at the master control system 82 where the demand is initiated, however the function does not include other initiating factors. The function concludes with the retainer valve 60 closing with respect to riser 52. An appropriate SIL level for this sub-function may be SIL2. Verification that retainer valve 60 has been actuated to a closed position can be based on select parameters. For example, the verification may be based on detection of actuation current delivered by the master control system; detection of the actuation voltage required to achieve the desired current (implied impedance); detection of flow as measured by flow meters on the hydraulic power unit 86; and/or measuring a pressure response with transducers on the subsea accumulator module 88.

Another control technique/sub-function is used to isolate subsea well 30 via the shut-off valves, e.g. valves 62, 64, in the lower portion 56 of subsea test tree 26, as illustrated in FIG. 9. In this specific example, two shut-off valves are utilized for the sake of redundancy in the form of flapper valve 62 and ball valve 64, however one valve is sufficient to leave the subsea well 30 in a safe state. In this example, the emergency shutdown sub-function begins at the master control system 82 where the demand is initiated, however the function does not include other initiating factors. The function concludes with the flapper valve 62 and/or ball valve 64 closing with respect to subsea well 30. An appropriate SIL level for this sub-function may be SIL2. Verification that at least one of the flapper valve 62 and ball valve 64 has been actuated to a closed position can be based on select parameters. For example, the verification may be based on detection of actuation current delivered by the master control system; detection of the actuation voltage required to achieve the desired current (implied impedance); detection of flow as measured by flow meters on the hydraulic power unit 86; and/or measuring a pressure response with transducers on the subsea accumulator module 88.

The safety integrity levels (SILs) described herein are not necessarily derived from a risk-based approach for determining SIL levels as described in standard IEC61508, instead, the SIL levels sometimes are based on industry recognized standards for production system safety functions. Based on the minimum SIL requirements for each function as applies to the existing, layers of protection, the minimum SIL level for the various safety integrity functions, e.g. the sub-functions outlined in FIGS. 3-5, may be selected as SIL2.

Additionally, the subsea test tree 26 and its corresponding shut-off valves 60, 62, 64 may be operated completely independently with respect to operation of the production control system 24 which is used during normal operations. In this case, the overall control system 32 may comprise completely independent control systems for the subsea test tree 26 and the production control system 24. The subsea test tree 26 may be installed within the production control system 24, e.g. inside a Christmas tree, during operation inside the blowout preventer stack 40. In the event that the blowout preventer 40 is required to close, the subsea test tree 26 is sealed and disconnected from the string (separated at connector 58). This allows the upper portion 54 of the subsea test tree 26 to be retracted so the blowout preventer rams can be closed without interference.

If the upper portion 54 cannot be unlatched and retracted during a subsea test tree failure mode, the shear rams 48 may be operated to sever the tool and safely close the well. The blowout preventer control system has no influence on the safety functions of the subsea test tree system. One example of a closing pattern comprises closing the upper retainer valve 60, followed by closure of the lower ball valve 64 and subsequent closure of the flapper valve 62. Once the upper production string is sealed via retainer valve 60 and access to the wellbore is sealed via ball valve 64 and flapper valve 62, the subsea test tree is disconnected and separated at connector 58.

Figure 10:
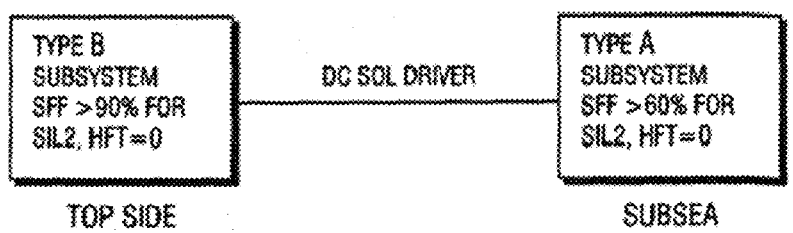
FIG. 10 is a schematic illustration of safety relevant parameters topside and subsea.

Specific safety relevant parameters may be selected according to the system design, environment, and applicable requirements in a given geographical location. However, one example of a typical approach is illustrated in FIG. 10 as having a safe failure fraction exceeding 90% on the topside for a Type B safety system (complex) and a hardware fault tolerance of zero, per standard IEC61508-2. At the subsea location, the system comprises a Type A subsystem having a safe failure fraction greater than 60% and a hardware fault tolerance of zero. Final elements on the topside may be evaluated to the DC fault model per IEC61508-2 (fault stuck at Vcc and stuck at Gnd, as well as stuck open and stuck shorted). Final elements in the subsea portion of the system are evaluated as a Type A system because only discrete passive components are used. All failure modes of these components are well defined and sufficient field data exists to be able to assume all fault conditions.

The accumulator module 88 may be incorporated into the overall system in a variety of configurations and at a variety of locations. In one example, accumulator module 88 is as pressure balanced accumulator to provide hydraulic power to the system in case of emergency closure and disconnect and/or loss of hydraulic power from the surface.

Accumulators are devices that provide a reserve of hydraulic fluid under pressure and are used in conventional hydraulically-driven systems where hydraulic fluid under pressure operates a piece of equipment or a device. The hydraulic fluid is pressurized by a pump that maintains the high pressure required.

If the piece of equipment or the device is located a considerable distance from the pump, a significant pressure drop can occur in the hydraulic conduit or pipe which is conveying the fluid from the pump to operate the device. Therefore, the flow may be such that the pressure level at the device is below the pressure required to operate the device. Consequently, operation may be delayed until such a time as the pressure can build up with the fluid being pumped through the hydraulic line. This result occurs, for example, with deep water applications, such as with subsea test tree and blowout preventer equipment used to shut off a wellbore to secure an oil or gas well from accidental discharges to the environment. Thus, accumulators may be used to provide a reserve source of pressurized hydraulic fluid for this type of equipment. In addition, if the pump is not operating, accumulators can be used to provide a reserve source of pressurized hydraulic fluid to enable the operation of a piece of equipment or device.

Accumulators may include a compressible fluid, e.g., gas, nitrogen, helium, air, etc., on one side of a separating mechanism, and a non-compressible fluid (hydraulic fluid) on the other side. When the hydraulic system pressure drops below the precharged pressure of the gas side, the separating mechanism will move in the direction of the hydraulic side displacing stored hydraulic, fluid into the piece of equipment or the device as required.

When some types of accumulators are exposed to certain hydrostatic pressure, such as the hydrostatic, pressure encountered in subsea operations, the available hydraulic fluid is decreased since the hydrostatic pressure must first be overcome in order to displace the hydraulic fluid from the accumulator. However, pressure balanced accumulators may be employed to overcome the above-described shortcomings. Examples of pressure-balanced accumulators are disclosed in U.S. Pat. No. 6,202,753 to Benton and U.S. Patent Publication No. 2005/0155658-A1 to White.

Figure 11:
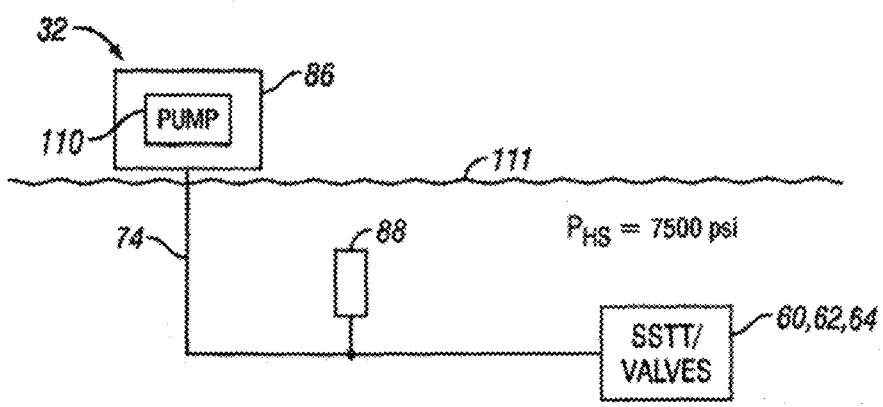
FIG. 11 is a schematic illustration of one example of the subsea control system incorporating a pressure balanced accumulator.

Referring, generally to FIG. 11, an example of one implementation of accumulator module 88 is illustrated. In this example, accumulator module 88 is a pressure balanced accumulator system. The accumulator system 88 is connected with the one or more hydraulic lines 74 routed between hydraulic power unit 86 and subsea test tree 26. Hydraulic, power unit 86 may comprise one or more suitable pumps 110 far pumping hydraulic fluid. The hydraulic power unit 96 is located above a sea surface 111 and provides control fluid for the operation of, for example, blowout preventer 40 and the valves 60, 62, 64 of subsea test tree 26. The pressurized hydraulic fluid from hydraulic power unit 86 also is used to charge the pressure balanced accumulator system 88. By way of example, the hydrostatic pressure $P_{HS}$ supplied by pump 110 is approximately 7500 psi, although other pressure levels may be used.

Referring generally to FIGS. 12 and 13, one embodiment of a pressure balanced accumulator 88 is illustrated. The illustrated embodiment is readily utilized in conjunction with subsea test tree 26, production control system 24, and control system 32. As illustrated, the pressure balanced accumulator 88 comprises a housing 112, which is a generally tubular-shaped member having two ends 114 and 116. An accumulator mechanism 118 is located within the housing 112 proximate the first end 114. The accumulator mechanism 118 comprises a first chamber 120 (see FIG. 13) for receiving a pressurized gas at a first pressure. The pressurized gas may, for example, be injected into chamber 120 through gas precharge port 122. In one embodiment of the present invention, the gas in the first chamber 120 is helium, and it is pressurized to approximately 3500 psi, although other pressures may be used depending, on the specific application.

With further reference to FIGS. 12 and 13, accumulator mechanism 118 also comprises a second chamber 124 for receiving a first pressurized fluid at a second pressure. The pressure of the fluid in chamber 124 is sometimes referred to as the "gauge pressure." In one embodiment, liquid may be injected into chamber 124 via a seal stab port 126. The liquid injected into chamber 124 may be in the form of a water glycol mixture according to one embodiment of the present invention. By way of example, the mixture may be injected into chamber 124 at a pressure of approximately 5000 psi, although other pressures may be utilized in other applications. Chambers 120 and 124 are hermetically sealed from one another at regions 128 and 130.

The pressure balanced accumulator system 88 may further comprise a third chamber 132 which abuts accumulator mechanism 118 in housing 112. Third chamber 132 contains a fluid, which may be injected into chamber 132 via fluid fill port 134. In one embodiment, the fluid injected into third chamber 132 is silicon oil, which is selected for use because of its lubricity and because it will not adversely affect seals 136 deployed to seal along one end of chamber 132. Initially, the silicon fluid is not injected into third chamber 132 under pressure. In operation, however, the pressure of the fluid in chamber 132 tracks the pressure of the fluid in second chamber 124, as described below.

Pressure balanced accumulator 88 also comprises a piston 138 which is located within the housing proximate the second end 116 of housing 112. The piston 138 has a first end 140 and a second end 142 which have first and second cross-sectional areas, respectively. In one embodiment, the cross-sectional areas of piston ends 140 and 142 are circular in shape. Piston 138 is movable between a first position, as shown in FIG. 12, and a second position in which piston end 140 is stopped by a shoulder 144.

Housing end 116 also may comprise an ambient pressure port 146. When pressure balanced accumulator 88 is used in a subsea environment, ambient pressure port 146 permits the ambient subsea pressure to impinge on end 140 of piston 138.

In the illustrated embodiment, pressure balanced accumulator system 88 also comprises an atmospheric chamber 148 which includes an annular recess 150 formed between piston 138 and the wall of housing 112; an axial cavity 152 which is formed by hollowing out a portion of piston 138; and a passage 154 connecting annular recess 150 and axial cavity 152. This atmospheric chamber allows differential pressure to exist across piston 138 which enables the piston to start to move when an equilibrium pressure exists across piston 138 as discussed below. In one embodiment, the pressure in the atmospheric, chamber is 14.7 psi, the volume of annular recess 150 is approximately 10 in.$^3$, and the volume of axial cavity 152 is approximately 200 in.$^3$.

In subsea applications, such as the subsea applications described above, accumulator module 88 may be located in a subsea environment to control the operation of an in-riser or open water intervention system, such as subsea test tree 26 and associated valves 60, 62, 64. The first and second chambers 120 and 124 in accumulator mechanism 118 of pressure balanced accumulator system 88 are precharged prior to placement of pressure balanced accumulator system 88 in the subsea environment. Pump 110, which is located above the sea surface 111, provides the control fluid for the operation of blowout preventer 40 and shut-off valves 60, 62, 64. The pump 110 also provides a charging input to second chamber 124 of accumulator mechanism 118 in pressure balanced accumulator system 88.

For purposes of illustration, it can be assumed that the hydrostatic pressure, $P_{HS}$, in which pressure balanced accumulator 88 is operating is 7500 psi, although other pressures may be employed. This ambient pressure is communicated through ambient pressure port 146 of accumulator system 88 and impinges on end 140 of piston 138. The force acting on piston 138 at its end 140 is given by the formula.

$$F_1 = P_{HS} \times (\text{the area of piston end 140}). \qquad (1)$$

The force on end 142 of piston 138 is given by the formula:

$$F_2 = (P_{HS} + 5000) \times (\text{the area of piston end 142}). \qquad (2)$$

In one specific example of the present invention, piston ends 140 and 142 are circular in cross-section and have cross-sectional areas established by diameters of 3.375 inches and 2.688 inches, respectively, although the sizes are for purposes of explanation only. At the hydrostatic pressure of 7500 psi, the equilibrium pressure, $P_E$, at which the piston 138 starts to move is:

$$P_E = 7500(3.375 \; 2.688)2 = 11{,}824 \; \text{lbf}(3) \#\#EQU100001\#\#$$

The gauge pressure $P_G$ at which the piston begins to move is given by the formula:

$$P_G = P_E - P_{HS} = 11{,}824 - 7{,}500 P_G = 4{,}324 \text{ psi} \quad (4)$$

In accordance with the present invention, the diameter of piston ends 140 (D.sub.1) and 142 (D.sub.2) may be sized for optimal efficiency at a predetermined hydrostatic pressure, using the following formula:

$$D1 = (PHS + PC - S) PHSD2 \quad \text{EQU3000014}$$

where P.sub.C is the pressure to which the second chamber of accumulator mechanism 118 is charged, e.g., 5000 psi, and S is a hydraulic safety factor which is an allowance given to prevent instability in maximum hydrostatic conditions. For a hydrostatic pressure of 7500 psi, S is approximately 500 psi. If D.sub.2=2.688 inches as in the above calculation with respect to equations (3) and (4) then D.sub.4 according to equation (5) is 3.40 inches.

Figure 14:
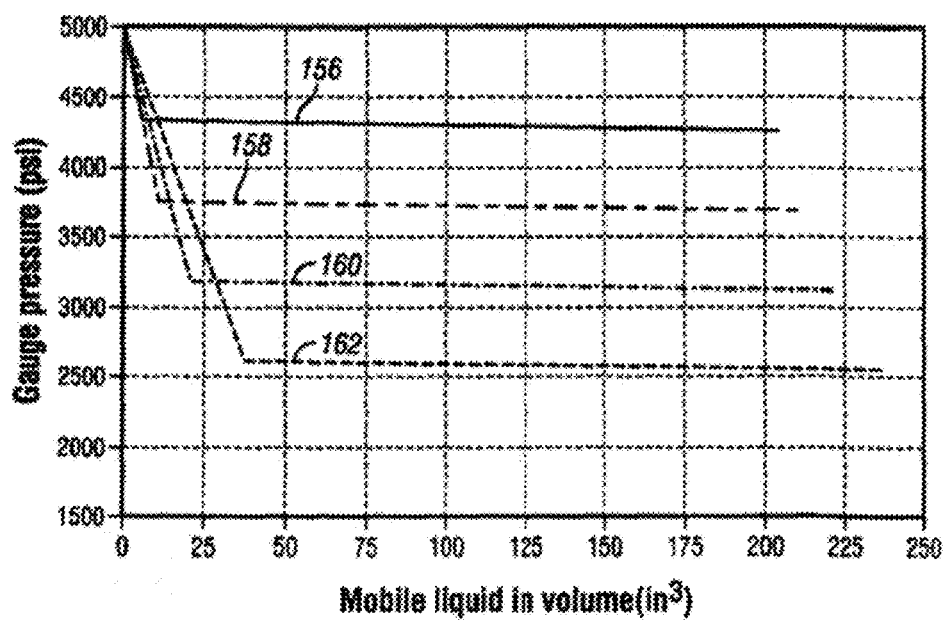
FIG. 14 is a graph illustrating fluid volume expelled from the pressure balanced accumulator at different hydrostatic pressure levels.

In FIG. 14, a graph is presented with a graph line 156 provided to illustrate the fluid volume of fluid expelled from the accumulator mechanism 118 at a hydrostatic pressure of 7500 psi and with D.sub.1 and D.sub.2 being 3.375 inches and 2.688 inches, respectively. Graph lines 158, 160 and 162 illustrate fluid volume expelled at hydrostatic pressures of 6500, 5500 and 4500 psi, respectively.

In certain embodiments, the control system 32 may comprise a subsea control assembly 164 to control the subsea test tree 26 located in the blowout preventer 40 of subsea installation 22. As illustrated schematically in FIG. 15, the subsea control assembly 164 may be connected into an overall pipe string 166 extending down through riser 52. The previously-described insulation 212 can be used along sections of the pipe string 166 wherever temperature sensitive components or devices are located in the annulus. For example, the subsea control assembly 164 may be connected in line between the subsea test tree 26 and a landing string pipe 168 of the overall pipe string 166. It should further be noted that the subsea control assembly 164 also may be employed to control various other devices below the subsea installation 22 and/or devices integrated with completion components below the subsea test tree 26. By way of example, the subsea control assembly 164 may be employed to control valves, sensors, actuators, latches, and other devices.

Figure 15:
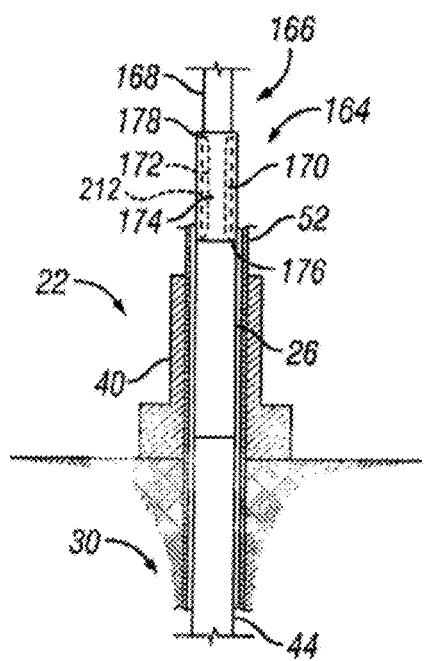
FIG. 15 is a schematic illustration of a subsea installation having a subsea test tree and a subsea control assembly comprising a subsea control module and an interior mandrel.

The subsea control assembly 164 may be formed with a subsea control module 170 mounted around an internal, mandrel 172. This allows the subsea control assembly 164 to become an integral part of an internal pressure and load bearing landing string. The subsea control assembly 164 may be constructed as a single lift, multicomponent unit. For example, the subsea control module 170 may be constructed with a plurality of sections which are slid over and locked to mandrel 172, which is a central, pressure containing, load bearing mandrel. The sections of subsea control module 170 may be connected via hydraulic and electrical jumpers. In this example, the mandrel 172 comprises a central pipe 174 having end hubs 176, 178 for connection with the subsea test tree 26 and the landing string pipe 168, respectively. In this instance, the insulation 212 can be secured to extend about and along the pipe 174 to be integrated with the subsea control module 170, as shown in FIG. 15.

Figure 16:
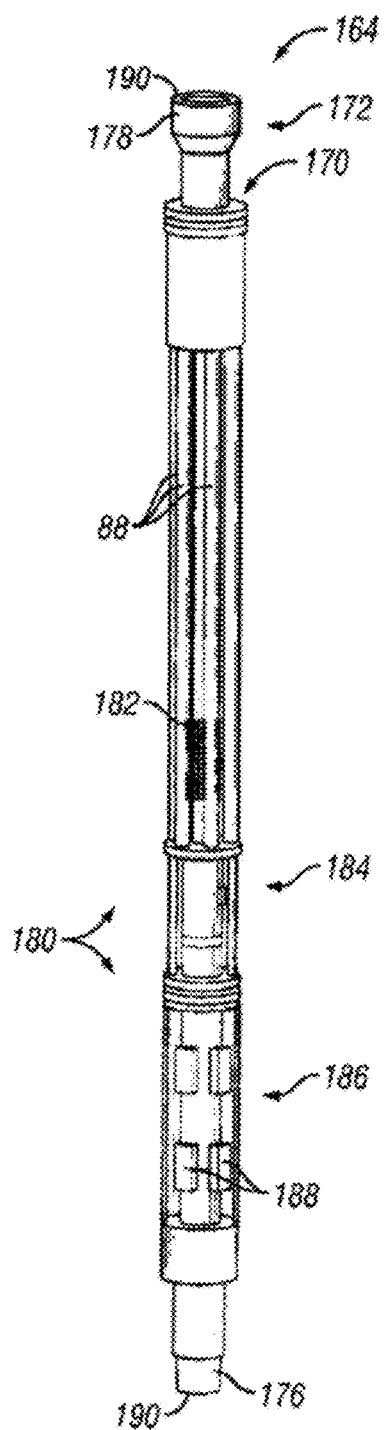
FIG. 16 is a view of one example of the subsea control assembly illustrated in FIG. 15.

One embodiment of the subsea control assembly 164 is further illustrated in FIG. 16. In this embodiment, the subsea control module 170 is mounted around mandrel 172 and comprises a plurality of sections 180. The sections 180 may be integrally formed and mounted around mandrel 172, or the sections 180 may be individually slid over mandrel 172, locked to the mandrel, and coupled to each other as necessary. For example, hydraulic and electrical connections may be formed with hydraulic and electrical jumpers between the plurality of sections 180.

In the particular example illustrated, the plurality of sections 180 forming subsea control module 170 comprises an upper section having at least one accumulator, e.g. accumulator 88, a hydrostatic pressure/temperature compensator 182 (e.g., volume compensator), and a subsea electronics module 184. The upper section 180 is coupled to a lower section comprising a hydraulic, valve manifold pod 186. By way of example, the at least one accumulator 88 may comprise a plurality of the accumulators, such as the five pressure-balance accumulators, illustrated as deployed around mandrel 172. Depending on the application, the accumulators may be used to store hydraulic fluid at or up to a desired pressure, e.g. 7500 psi, above hydrostatic while at the subsea location. The insulation 212 may extend between the mandrel 172, and specifically on the pipe 174 thereof, and the pressure-balanced accumulators 88 disposed thereabout.

The subsea electronics module 184 receives electronic signals from the topside master control system 82 and operates appropriate valves 188, e.g. solenoid operated valves 94 and/or directional control valves, of hydraulic valve manifold pod 186. As described above, the solenoid operated valves 94 may be used to direct hydraulic fluid to the desired subsea actuators used to actuate valves 60, 62, 64 or other subsea components. The hydraulic, valve manifold pod 186 may be constructed with hydraulic. Manifolds containing the solenoid operated valves and directional control valves. Additionally, the hydraulic valve manifold pod may comprise filters, relief valves, and other components mounted within an oil-filled pressure compensated enclosure. The pressure compensation may be provided by the hydrostatic pressure/temperature compensator 182. Again, insulation 212 can be secured to the section of the mandrel pipe 174 extending along the subsea electronics module 184 and the hydraulic manifold pod 186.

The one or more sections 180 of subsea control module 170 are designed to allow removal and replacement of mandrel 172. Accordingly, the overall subsea control assembly 164 enables use of an interchangeable mandrel. In some embodiments, for example, the plurality of sections 180 is designed to enable use of mandrels having differing diameters such that the internal mandrel 172 may be interchanged with another mandrel having a larger and/or smaller diameter. As a result, the subsea control assembly 164 may be constructed as a modular assembly in which the mandrel 172 and the control module sections 180 are interchangeable. In one specific example, this allows the mandrel 172 to be interchanged to enable operation of the subsea control module at different operating bore pressures, e.g. 10,000 psi or 15,000 psi operating bore pressures. As a result, the subsea control module 170 is not affected by the bore pressure or contents and thus can be adapted to a variety of bore pressures by interchanging mandrels.

For special applications and/or to meet specific client requirements, the mandrel 172 is easily changed to accommodate custom pressures and/or materials. This allows one universal subsea control module 170 to be used for a wide range of existing and future well conditions. The mandrel 172 also may be designed with a variety of connector mechanisms at its hubs 176, 178 to accommodate easy connection into the pipe string 166. By way of example, hubs 176, 178 may utilize premium thread connections 190 for make-up to the adjacent tool hubs at either end of the subsea control assembly 164. The end connections and the interchangeability of mandrel 172 also allow the mandrel to be easily removed for periodic inspection and recoating. Inspection and recoating promotes system longevity by preventing corrosion otherwise caused by wellbore fluids and external completion fluids encountered in deep offshore wells.

The overall subsea control system 20 may be designed for use in a variety of well applications and well environments. Accordingly, the number, type and configuration of components and systems within the overall system may be adjusted to accommodate different applications. For example, the subsea test tree may include different numbers and types of shut-off valves as well as a variety of connectors, e.g., latch mechanisms, for releasably connecting the upper and lower parts of the subsea test tree. The production control system also may comprise various types and configurations of subsea installation components. Similarly, the control system 32 may rely on various topside and subsea components which enable independent control over the subsea test tree and the blowout preventer. For example, subsea control assemblies may be designed for integration into the pipe string with an interchangeable mandrel and a variety of control module sections selected according to the specific well application.

In some applications, the control system utilizes surface components which are computer-based to enable easy input of commands and monitoring of subsea functions. As described above, programmable logic controllers also may be employed and used to carry out various sub-functions implemented in emergency shutdown procedures. Various adaptations may be made to accommodate specific environments, types of well equipment, applicable standards, and other parameters which affect a given subsea well application.

Although only a few embodiments of the present invention have been described in detail above, those of ordinary skill in the art will readily appreciate that many modifications are possible without materially departing from the teachings of this invention. Accordingly, such modifications are intended to be included within the scope of this invention as defined in the claims.

What is claimed is:

1. A piping system for housing system components for regulating flow of fluid therethrough, the piping system comprising:
   an inner small diameter length of piping through which hot fluids flow;
   an outer larger diameter length of piping surrounded by cold fluid;
   an annulus between the small and larger diameter piping in which at least one system component is received;
   insulation material extending about a predetermined section of the small diameter length of piping for restricting heat transfer therefrom to the system component and allowing heat transfer from the system components in the annulus to the outer piping; and
   wherein the system component is selected from a group consisting of a pressure accumulator and a subsea electronics module.

2. The piping system of claim 1 wherein the small diameter piping is of a metal material and the insulation material is bonded to the metal material of the small diameter piping.

3. The piping system of claim 1 wherein the pressure accumulator includes a gas-charged hydraulic actuator.

4. An offshore oil well installation comprising:
   a production string extending in the ocean from a subsea well to a rig for flow of hot well fluid therethrough;
   a riser extending about the production string for isolating the production string from cold ocean water;
   an annulus between the production string and the riser;
   at least one temperature sensitive operating device in the annulus;
   insulation in the annulus between the production string and the riser to insulate the temperature sensitive operating device from the heat generated by flow of hot well fluid in the production string and keeping the temperature sensitive operating device exposed to cooling generated by cold ocean water surrounding the riser; and
   wherein the temperature sensitive operating device is selected from a group consisting of a pressure accumulator and a subsea electronics module.

5. The offshore oil well installation of claim 4 wherein the insulation comprises insulation material secured on the production string.

6. The offshore oil well installation of claim 4 wherein the insulation comprises filament wound epoxy fiberglass composite material, and the production string includes piping having a generally cylindrical outer surface to which the filament wound epoxy fiberglass composite material is bonded with the composite material having high flexural and tensile strength for staying bonded to the production sting piping despite flexing and tension loads to which the piping is subjected.

7. The offshore oil well installation of claim 4 wherein the insulation allows the temperature sensitive operating device to comprise an off-the-shelf operating device.

8. The offshore oil well installation of claim 4 wherein the pressure accumulator is a pressure balanced accumulator having a gas charge with the insulation minimizing temperature fluctuations across the pressure balanced accumulator to minimize variations of the gas volume of the gas charge for optimizing efficient operation of the pressure balanced accumulator.

9. The offshore oil well installation of claim 8 including a subsea test tree having valves operable for controlling the well and keeping fluid in the production string in the event of emergency conditions with at least one of the valves being actuated by the pressure balanced accumulator.

10. The offshore oil well installation of claim 4 further comprising electrohydraulic operating systems including the at least one temperature sensitive operating device.

11. The offshore oil well installation of claim 10 wherein the temperature sensitive operating device comprises an umbilical including a line for flow of hydraulic fluid therethrough and extending from the rig into the annulus.

12. The offshore oil well installation of claim 4 wherein the temperature sensitive operating device has an outer housing of high thermal conductivity material, and the insulation is disposed on a section of the production string adjacent the high thermal conductivity material to minimize the amount of heat drawn to one side of the outer housing generally facing the production string and drawing cooler temperatures from the riser to the other side of the outer housing facing the riser.

13. The offshore oil well installation of claim 12 wherein the temperature sensitive operating device comprises an accumulator, and the high thermal conductivity material of the outer housing is a metallic material.

14. A subsea control module for an offshore oil well installation, the subsea control module comprising:
   an inner mandrel;
   an outer riser in which the inner mandrel is received and for being surrounded by ocean water;
   a plurality of operating devices mounted to be disposed circumferentially about and to extend along the inner mandrel;
   insulation secured to extend about and along the inner mandrel adjacent to the operating devices;

wherein the operating devices are selected from a group consisting of pressure accumulators, subsea electronics modules, and a combination thereof; and wherein the inner mandrel comprises a central pipe having ends for being connected to conduits for flow of hot well fluid therethrough with the insulation insulating the operating devices from the heat generated by the flow of hot well fluid through the central pipe and keeping the operating devices exposed to cooling from the riser surrounded by the cold ocean water.

15. The subsea control module of claim 14 wherein the accumulators are pressure-balanced accumulators.

16. The subsea control module of claim 14 wherein the operating devices include a hydraulic valve manifold pod.

17. The subsea control module of claim 14 wherein the insulation comprises a layer of fiberglass epoxy composite wrapped around the inner mandrel and bonded thereto.

* * * * *